July 9, 1963 R. D. KOONTZ 3,096,958
RIBBED SHEET STRUCTURE
Filed Jan. 22, 1959

INVENTOR
ROBERT D. KOONTZ
BY
Carpenter, Abbott, Coulter & Kinney
ATTORNEYS

United States Patent Office 3,096,958
Patented July 9, 1963

3,096,958
RIBBED SHEET STRUCTURE
Robert D. Koontz, Manhattan Beach, Calif., assignor, by mesne assignments, to Minnesota Mining and Manufacturing Company, St. Paul, Minn., a corporation of Delaware
Filed Jan. 22, 1959, Ser. No. 788,296
4 Claims. (Cl. 244—123)

This invention relates to ribbed panels or skins of continuous filament reinforced plastic sheet material and to an apparatus and method for producing such structures.

In the art of reinforced plastics, strong, lightweight, tough, self-sustaining sheet material have been developed, these materials being composed as a class, of a resinous sheet reinforced with layers of continuous, non-woven, lineally aligned, parallel filaments. These sheets may be formed as single layer sheet materials or as multi-layer laminates with the continuous filaments of each layer being at an angle to, or parallel with, the filaments of the next adjacent layers, and thereafter thermoset to tough, hard, exceptionally strong panels, or skins for aircraft and the like.

As initially formed, these sheet materials are flexible and deformable, providing panel-forming members which can be draped or otherwise conformed to various shapes and thereafter cured, by thermosetting, upon the application of heat and pressure thereto, to tough, strong skins or panels of permanent shape retention and having exceptional tensile strength imparted by the continuous filament reinforcing.

Panels or skins made up of these materials are exceptionally strong, lightweight structural units. However, the inclusion of reinforcing ribs or the like on such panels has heretofore been a tedious, time consuming procedure having limited applicability. For example, in joining these skins or panels to one another in the formation of hollow wall structures, such as are found in aircraft wing sections, radomes, antennas, and the like, one procedure has been to first cure the sheet material into the desired panel shape, and in formation of a hollow wall structure, connect the panels in spaced relation to one another by adhesively bonding them to a cured channel or Z-shaped web of the same sheet material. The continuous filaments of the web are usually disposed at an angle to the longitudinal direction of the web in order to provide shear strength longitudinally along the web. The web is adhesively bonded to the skins through the medium of a thermosetting adhesive. This procedure necessitates separate curing cycles for panels or skins and the web, requires hand layup in the positioning of the webs and skins, and requires a separate thermosetting bonding operation in adhesively joining the webs to the skins.

Another procedure that has been utilized to provide ribs on these reinforced sheet materials has been to preform individual strips of sheet material into L shapes, thereafter joining the L-shaped strips in back-to-back relation to one another with a cover strip of the same sheet material over the crosshead of the resultant T-shaped structure. The sheet materials so assembled are then fused into a unitary permanently ribbed panel, or skin structure.

Both of these prior methods of providing ribbed reinforced panel, or skin, structures of continuous filament reinforced resinous sheet material are severely limited in their application and are not readily adapted to mass production techniques due to the necessity in the formation of the ribs on the sheet material of following a multiplicity of tedious hand layup operations, rendered even more tedious if multi-directional shear strength is required in the rib.

This invention provides new and useful ribbed continuous filament reinforced plastic panels or skins which readily lend themselves to mass production techniques and necessitate no hand layup operations. This invention provides a reinforced plastic structure comprising a panel formed of a thermosetting resinous sheet material reinforced with a plurality of layers of continuous, non-woven, lineally arranged, parallel filaments, and a rib reinforcing said panel, said rib being formed from a thermosetting resinous molding compound, the resin of said sheet material and that of said molding compound being of compatible resin systems and being thermoset while in intimate contact with one another thereby fusing said rib and said sheet material together.

Further, in a preferred embodiment, the ribbed panels or skins of this invention combine the exceptionally high tensile strength of the continuous filament reinforced panel with a rib structure possessing uniform shear strength in all directions. This construction represents a major breakthrough in the formation and fabrication of ribbed panels of continuous filament reinforced plastic sheet stock.

In the practice of this invention, a preferred procedure is one wherein the continuous filament reinforced resinous sheet material which is to be formed into a ribbed panel is placed on, and shaped to, the configuration of a supporting platen, or similar support, of the desired panel contour. An intermediate female mold is then placed in position whereby the sheet material is sandwiched between the mold and the platen. This intermediate female mold is provided with at least one slot therethrough opening at one end into the mold surface contacting the continuous filament reinforced resinous sheet material and at its other end into the exposed female mold surface. This slot may be of any desired cross sectional shape to correspond to the required rib cross section. The exposed mold surface of the intermediate female mold is preferably provided with a trough-like depression for retaining molding compound prior to compaction into the slot and into which the other end of the slot opens.

A male mold having projections coextensive with, and in alignment with, the slots is positioned in stacked relation to the intermediate female mold to enable the penetration of the projections into the troughs as both molds are pressed against the resinous sheet material to compact the molding compound into mold slots and press this resin into intimate contact with the continuous filament reinforced resinous sheet material. This operation is accompanied by sufficient heat, in accordance with the pressure used, to thermoset both the rib resin and the sheet resin to thereby fuse them together into an integral rib and panel structure.

The preferred resin compositions, both for the molding compound and the continuous filament reinforced sheet material, are those solvent-free thermosetting resins which contain glass filaments having diameters on the order of about 0.00015–0.0006 inch (4 to 15 microns) in a glass-to-resin volume ratio of between about 65:35 and 35:65. The rib forming molding compound is preferably of the same resin system as that of the continuous filament reinforced panel-forming sheet material and is reinforced with short, discontinuous, randomly disposed filaments, preferably no longer than about 3 inches and averaging approximately ½ inch in length, to provide uniform shear strength in any direction and homogeneity of panel and rib resins on thermosetting. However, it is only necessary that the resin systems of the ribs and the panel, or skin-forming sheet material, be compatible with one another in the sense that they will fuse together in the same thermosetting operation.

Combining the preferred resin compositions provides a reinforced plastic structure comprising a self-sustaining panel of a resinous sheet material reinforced with continuous, non-woven, lineally aligned filaments and having at least one rib integrally molded therewith, said rib being composed of a moldable discontinuous filament reinforced resin strongly, adherently fused to said panel and possessing relatively uniform shear strength in all directions. Discontinuous reinforcing filaments of the rib blend into the panel structure as the panel layers are compressed at the rib juncture thereby additionally strengthening the panel against longitudinal shear in the filament direction and further integrally joining the rib and panel.

The resulting structures are extremely useful as lightweight rib reinforced panel or skin structures, as well as being useful in the production of all types of hollow walled structures, such as aircraft wing and tail sections, radomes, antennas, hollow wall insulating structures, and similar structures. These ribbed panels combine the lightweight, structural rigidity, impact resistance, and unusually high tensile strength imparted by lineally aligned and oriented continuous filament reinforced resinous sheet materials with the uniform multi-directional shear strength imparted by the randomly distributed discontinuous filament reinforced molding compound. Not only is a structure provided wherein these unique structural properties are combined, but, in addition, there is provided a greatly simplified structural formation procedure, coupled wtih new ease of panel assembly in the production of hollow wall structures utilizing facing panels or skins formed from continuous filament reinforced plastic sheet materials.

The invention will be more specifically described with reference to certain preferred embodiments thereof illustrated in the accompanying drawings wherein.

Figure 1:
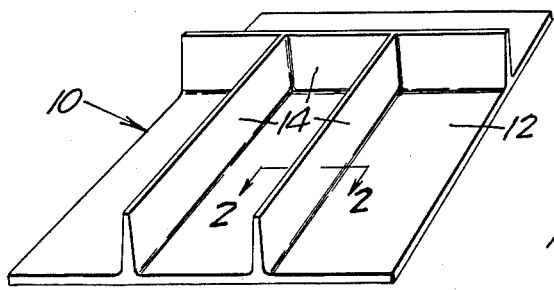
FIGURE 1 is an isometric view of a ribbed panel made in accordance with the teachings of this invention.

Referring now to the accompanying drawings in detail there is illustrated in FIGURE 1 a ribbed panel structure 10 of the preferred type formed in accordance with the teachings of this invention. The structure comprises basically a panel 12 and reinforcing ribs 14.

Figure 2:
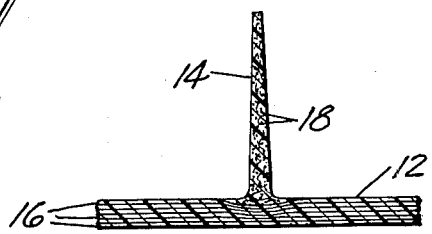
FIGURE 2 is a cross sectional view on a greatly enlarged scale through a portion of the panel illustrating the rib and panel juncture.

In the enlarged cross sectional view of FIGURE 2, the panel 12 is seen to be composed of a plurality of layers of resinous, continuous filament reinforced sheet material 16 fused to one another and having an integrally formed rib 14 reinforced with discontinuous, randomly disposed filaments 18.

Figure 3:
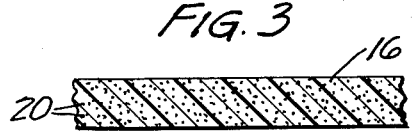
FIGURE 3 is a cross sectional veiw on an enlarged scale of a layer of the panel forming resinous sheet material.

In FIGURE 3, there is illustrated a greatly enlarged cross sectional view across the reinforcing filaments of one of the layers 16 of the panel 12, disclosing a plurality of closely spaced, parallel, lineally arranged continuous filaments disposed in bundles in side by side relation.

Thus, the preferred ribbed panel structure 10 is in its entirety, composed of a fused resin containing two different reinforcing systems, one reinforcing system being composed of the lineally arranged, continuous, parallel filaments in the panel 12 whereby the panel is provided with exceptionally high tensile strength, and the other comprising the randomly disposed, discontinuous fibers 18 of the rib 14 whereby the rib is provided with a high degree of shear strength in any direction, the randomly disposed discontinuous filaments additionally penetrating into the panel thickness and becoming intermingled with the resin therein. The compression of the panel layers upon compacting of the web forming material and the presence of the discontinuous fibers penetrating into the panel proper are believed to greatly enhance the shear strength of the panel layers in the continuous filament direction as well as to reinforce the panel and rib juncture against rupture due to shear or twisting forces against the rib.

Figure 4:
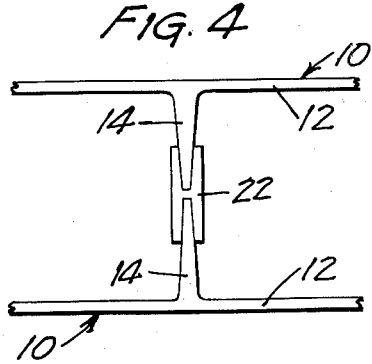
FIGURE 4 is an end view illustrating a means for joining panel ribs in the formation of a hollow wall structure.

In FIGURE 4, there is disclosed a procedure for forming a hollow wall structure utilizing the ribbed panels 10 of this invention. In the illustrated construction, the panel walls 12 are disposed in spaced facing relation to one another with the ribs 14 disposed in edge to edge relation to one another. An H-shaped strip 22 receives between each pair of legs thereof one of the ribs 14 of the facing panels 12, the tips of the ribs seating against the crossbar of the strip. A suitable adhesive or the like, coated on the rib contacting surfaces of the strip can be used to permanently adhere the ribs 14 to the strip 22 providing a simple and economical manner of forming a web joining these ribbed panels or skins in the formation of a hollow wall structure. Of course, other types of joint splicing may be used and in fact, the ribs 14 may even be lapped over one another and adhered to provide the spacing web for the hollow wall structure.

Figure 5:
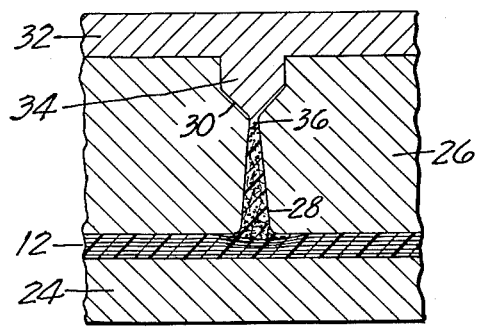
FIGURE 5 is a cross sectional view through the rib and panel forming apparatus disclosing the manner in which the molding compound is compacted into the rib-forming slots in the rib formation.

In FIGURE 5 there is disclosed in cross section a preferred apparatus for forming the ribbed panels of this invention. Essentially, there is shown in this figure a supporting platen or the like 24 on which is supported the panel forming sheet 12. An intermediate female mold 26 having a slot therethrough conforming to the desired rib shape 14 presses the panel forming sheet 12 to the desired thickness and confines the molding compound forming the rib 14 to the desired rib shape while maintaining this compound in intimate contact with the panel forming sheet. The upper end of the slot 28 opens into a shallow trough 30 into which the resinous molding compound forming the rib 14 may be measured prior to compaction into the rib-forming slot 28. A male mold 32 has a projection 34 thereof conforming to the shape of the trough 30 projecting thereinto whereby the rib-forming molding compound is forced into the rib-forming slot 28. A projecting tip 36 on the projection 34 of the male mold projects slightly into the upper reaches of the rib-forming slot 28 to cut-off the resin and assure clean separation of the mold platens from the rib when these mold and supporting platens are in closed position as shown in FIGURE 5 with the rib-forming and the panel-forming resins in intimate contact with one another, sufficient heat is supplied to the apparatus to thermoset these materials thereby fusing the panel and rib resins to one another during the thermosetting operation in the formation of the ribbed panel structure 10.

Figure 6:
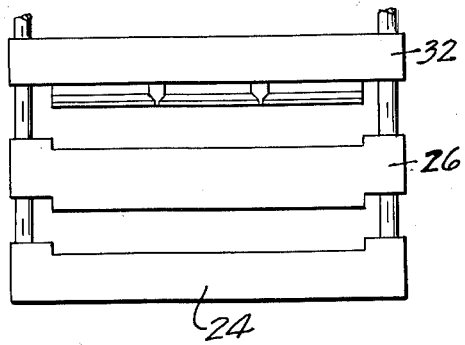
FIGURE 6 is a semi-schematic illustration of the molding apparatus of FIGURE 5.

The mold platens 32 and 26 are movable toward and away from one another and the platen 24 as illustrated in FIGURE 6, and may be mounted on a conventional mold press (not shown) for the production of the ribbed panels of this invention.

Figure 7:
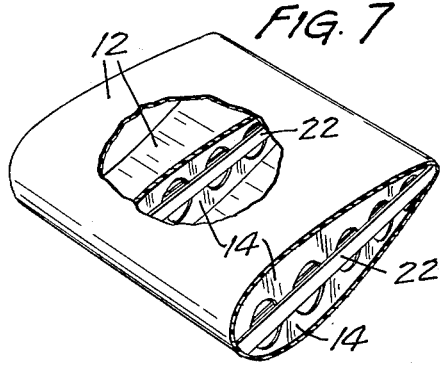
FIGURE 7 is an isometric view of a wing section formed from ribbed panels constructed in accordance with this invention.

In the formation of aircraft wing structures and the like, or other shapes, of course the supporting platen 24 is provided with a surface to conform the resinous sheet material of the panel 12 to the desired aerodynamic shape prior to thermosetting and the rib slots 28 are also formed to the desired aerodynamic configuration. For example, as shown in FIGURE 7, the upper and lower panels 12 are conformed to the aerodynamic shape desired and each rib 14 is formed in the shape of half of a wing rib. In the formation of the wing section, the wing-rib forming ribs 14 are joined by a joint forming strip 22 as illustrated in FIGURE 4. While this structure is illustrative of one specific hollow wall structure, displaying the simplified procedures made possible utilizing the reinforced plastic structures of this invention, the invention is not limited to any particular industry, and these new ribbed continuous filament reinforced panels may be used in any structural capacity, the structures serving as columns and beams as well as surfacing panel or skin structures.

The following example will serve to illustrate the formation of a ribbed panel structure, although it is to be understood the example is only illustrative and the invention is not limited thereto.

*Example*

A resinous sheet material of an epoxy resin reinforced with continuous glass filaments as shown in FIGURE 3 was placed on a supporting platen such as 24 in a mold press and into the troughs 30 of the intermediate female mold platen 26 was measured a molding compound of the same resin of the resinous sheet material, but reinforced with short, discontinuous, randomly disposed glass filaments. This compound, which has the appearance of a tacky mass of short pieces of straw lightly stuck together, was supplied to the troughs in an amount sufficient to be compacted within the rib forming slot to about 6 times its normal density.

The temperature of the mold platens and of the supporting platen was about 200° F. upon laying the sheet material and loading the troughs with the molding compound. The mold press was closed by lowering the female mold platen into position against the sheet material and moving the male mold platen 32 into closing relation with said female mold platen compacting the molding compound into the rib forming slots 28 and into intimate contact with the panel forming resinous sheet material.

The temperature of the platens was then gradually raised to 330° F. over a period of about 30 minutes, and thereafter maintained at that temperature for one hour to thermoset the resin and integrally fuse the rib and panel to one another.

I claim:

1. A reinforced plastic structure comprising a pair of spaced self-sustaining panel members and at least one connecting web joining said panels to one another and maintaining said panels in spaced relation to one another, each panel comprising at least one layer of a resinous sheet material reinforced with continuous, non-woven, lineally aligned filaments, and having at least one rib integrally formed therewith, said rib being composed of a molded fiber reinforced resin strongly adherently bonded to said panel and having randomly arranged short reinforcing fibers thereof intimately intermingled with the resin of said panel, said rib being molded to shape on said panel before hardening said panel and thereafter hardening said panel and said rib while they are maintained in intimate contact with one another, means joining these panel ribs to one another and thereby forming said connecting web.

2. A reinforced plastic wing section comprising top and bottom reinforced plastic skins joined to one another by at least one wing-rib, each self-sustaining skin comprising at least one layer of resinous sheet material reinforced with continuous, non-woven, lineally aligned filaments, and having at least one rib integrally formed therewith and forming a portion of the wing-rib, said rib being composed of a molded discontinuous fiber reinforced resin strongly adherently bonded to said skin and having reinforcing fibers therein intimately intermingled with the resin of said skin, said rib resin and said skin resin being of compatible resin systems, means joining said wing-rib portions to one another to form said wing section.

3. A reinforced plastic structure comprising a pair of spaced self-sustaining panel members and at least one connecting web joining said panels to one another and maintaining said panels in spaced relation to one another, each panel comprising at least one layer of a resinous sheet material reinforced with continuous, non-woven, lineally aligned glass filaments, and having at least one rib integrally formed therewith, said rib being composed of a molded fiber reinforced resin strongly adherently bonded to said panel and having randomly arranged short reinforcing glass fibers thereof intimately intermingled with the resin of said panel, said rib being molded to shape on said panel before hardening said panel and thereafter hardening said panel and said rib while they are maintained in intimate contact with one another, means joining these panel ribs to one another and thereby forming said connecting web, the glass-to-resin volume ratio of said ribs and said panels being about 65:35 to about 35:65.

4. A reinforced plastic structure comprising a pair of spaced self-sustaining panel members and at least one connecting web joining said panels to one another and maintaining said panels in spaced relation to one another, each panel comprising at least one layer of a resinous sheet material reinforced with continuous, non-woven, lineally aligned glass filaments, and having at least one rib integrally formed therewith, said rib being composed of a molded fiber reinforced resin strongly adherently bonded to said panel and having randomly arranged short reinforcing glass fibers thereof intimately intermingled with the resin of said panel, said rib being molded to shape on said panel before hardening said panel and thereafter hardening said panel and said rib while they are maintained in intimate contact with one another, means joining these panel ribs to one another and thereby forming said connecting web, the glass-to-resin volume ratio of said ribs and said panels being about 65:35 to about 35:65, the diameter of said filaments and fibers being from about 0.00015 to about 0.0006 inch.

References Cited in the file of this patent

UNITED STATES PATENTS

| | | |
|---|---|---|
| 2,216,863 | Visman | Oct. 8, 1940 |
| 2,412,908 | Platt et al. | Dec. 17, 1946 |
| 2,445,290 | Gonda | July 13, 1948 |
| 2,477,852 | Bacon | Aug. 2, 1949 |
| 2,503,450 | Nebesar | Apr. 11, 1950 |
| 2,571,692 | Dubois | Oct. 16, 1951 |
| 2,633,603 | Huse | Apr. 7, 1953 |
| 2,659,444 | Stanley | Nov. 17, 1953 |
| 2,682,685 | Mathues | July 6, 1954 |
| 2,794,756 | Leverenz | June 4, 1957 |
| 2,847,712 | Pollard et al. | Aug. 19, 1958 |
| 2,880,473 | Schwayder | Apr. 7, 1959 |